Figure 1:
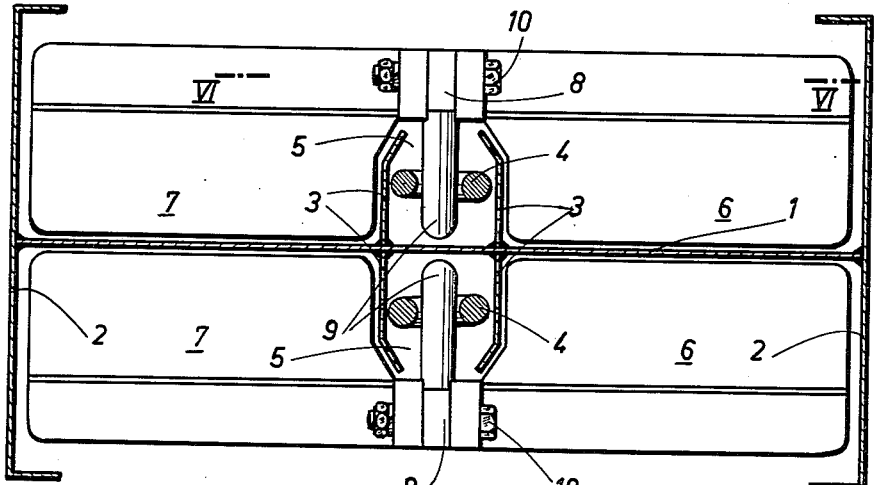

July 31, 1962 R. WIENER 3,047,129
SINGLE-CHAIN SCRAPER CONVEYOR
Filed Nov. 20, 1959 2 Sheets-Sheet 1

INVENTOR
RAINER WIENER
BY
HIS AGENT

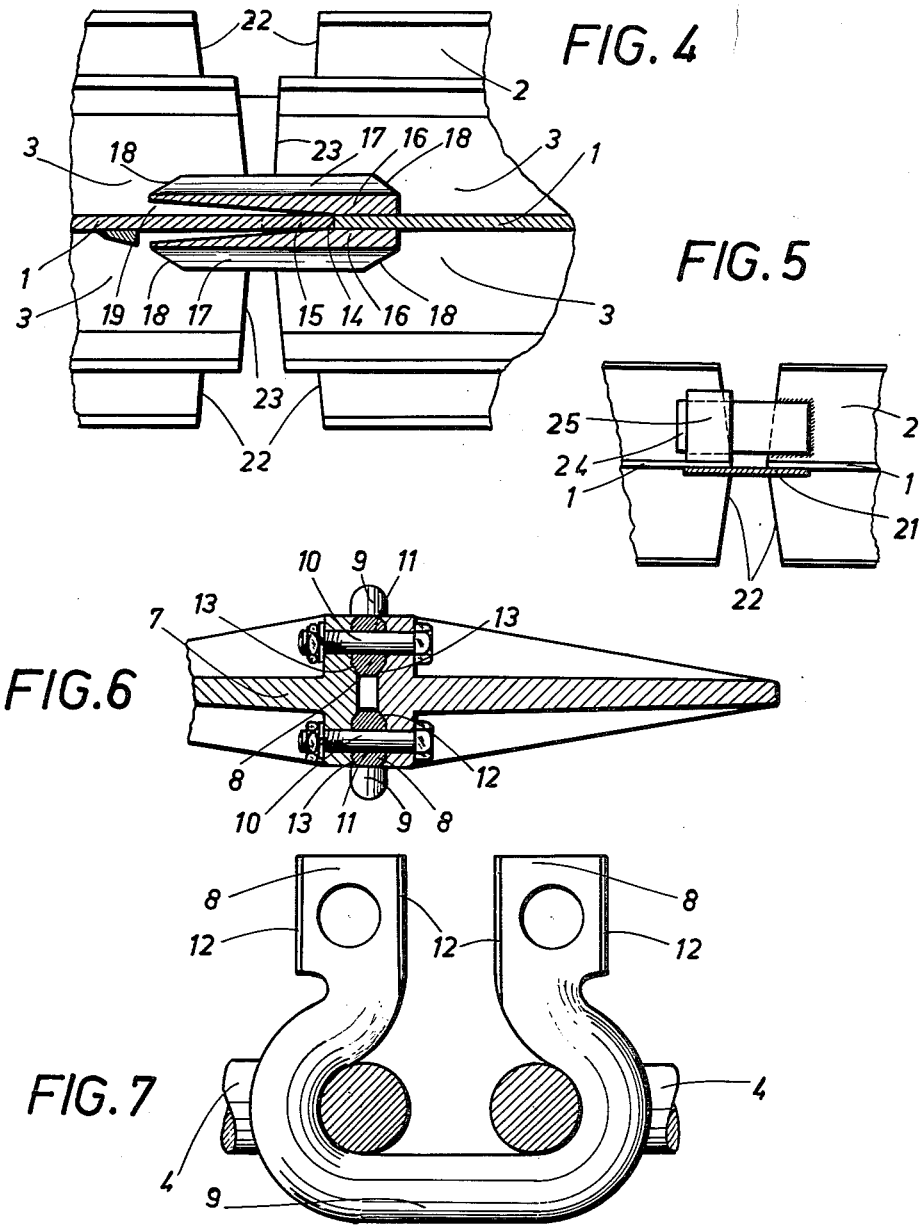

3,047,129
SINGLE-CHAIN SCRAPER CONVEYOR
Rainer Wiener, Linz on the Danube, Austria, assignor to Vereinigte Osterreichische Eisen- und Stahlwerke Aktiengesellschaft, Linz on the Danube, Austria
Filed Nov. 20, 1959, Ser. No. 854,322
Claims priority, application Austria Nov. 26, 1958
4 Claims. (Cl. 198—174)

It is known that scraper conveyors comprise scrapers which are transversely arranged in a conveyor trough composed of several sections and moved by a central chain or two lateral chains. For this reason such conveyors are referred to as single-chain or double-chain scraper conveyors. The previous single-chain scraper conveyors have strap chains to prevent the drivers from canting. These strap chains have the essential disadvantage that the lateral rigidity of the chain prevents an arrangement of the sections of the conveyor trough at an angle. For this reason the single-chain scraper conveyor has been replaced in most cases by the double-chain scraper conveyor although in this case the manufacturing cost is higher and the conveyor trough cannot be arranged with angles as desired. In double-chain scraper conveyors any angle in the conveyor trough towards one side must be compensated by an angle having the same value toward the other side unless the chain will be excessively tight on one side and slack on the other.

It is an object of the invention to provide a scraper conveyor which combines the advantages of the previous single- and double-chain scraper conveyor.

The invention is based on a single-chain scraper conveyor having scrapers which are guided by the side walls of the conveyor trough and slide on the bottom of the conveyor trough and resides in that the chain consists of a universally movable link chain held in a central chain guide, which consists of two pairs of stay plates which are welded respectively to the upper and lower surfaces of the bottom of the conveyor trough and which with their free longitudinal edges embrace the horizontal chain links, the scrapers having a central recess which corresponds to the chain guide. The universal movability of the link chain enables the formation of any desired angles in the conveyor trough and the central chain guide in the conveyor trough provides for the same conditions as where a strap chain is used. The conveyor trough may be formed even with a larger angle than in the case of a double-chain scraper conveyor and this angle may be directed only to one side because a single central chain cannot become slack. Compared to a double-chain scraper conveyor the output of the conveyor is hardly reduced owing to the better utilization of the conveyor cross-section and the reduced chain friction. It is obvious that the manufacturing and material costs and the overall weight of the conveyor can be substantially reduced. The stay plates forming the chain guide prevent any rising of the upper run and sagging of the lower run of the chain and of the scrapers and thus fulfill an additional function, the central recess in the scrapers being necessary to enable the latter to slide on the bottom of the conveyor trough.

To ensure the formation of an angle in the conveyor trough which is enabled by the use of a universally movable link chain the invention proposes further that adjacent to the joint between two sections of the conveyor trough between the two stay plates the bottom of one section of the conveyor trough has an approximately semicircular recess and the bottom of the other section has a tongue which conforms to and engages said recess, two cover rails having a guide groove for the vertical chain links and suitably formed with oblique run-up surfaces at their ends bridge the joint above and below the same, which cover rails are welded to the bottom of one of the sections of the conveyor trough and between their protruding parts form a wedge-shaped gap. The recess and tongue form a joint, which enables a relative pivotal movement of the two sections of the trough about the center of the recess without need for a pivot pin or other means for this purpose. The recess and tongue may even be made with a single punching operation. The cover rails ensure that the tongue is on the proper level in the recess and enable the formation of an angle in the upward or downward direction in the conveyor trough because a wedge-shaped gap is left between the protruding parts of the cover rails, which gap provides for an adequate play enabling a relative pivotal movement of the trough sections in the vertical direction. Besides, the cover rails provide for a good guidance of the chain adjacent to the joint so that any catching, canting or binding of the chain is avoided.

In a development of the invention the transverse edges of the bottom of the conveyor trough extend obliquely rearwardly from the center of the recess and tongue, respectively, so that the range of the pivotal movement is enlarged. To avoid a falling of the material conveyed through the wedge-shaped gap between two sections it is sufficient to weld lap plates on both sides of the chain guide to the bottom of one section of the conveyor trough, which plates extend below the bottom of the other section. Similar, the transverse edges of the side walls of the conveyor trough and, if desired, of the stay plates extend obliquely rearwardly in upward and downward directions, respectively, to enable an angle to be formed in the vertical direction. A flexible flap may be welded to each of the side walls of the succeeding sections of the conveyor trough, considered in the direction of conveyance, which flap engages the side wall of the adjacent section of the conveyor trough and may be received by a keeper provided there. These flaps prevent the material conveyed from emerging through the butt joints on the sides whereas they do not interfere with the provision of lateral angles because the flaps consist of highly flexible material.

According to the invention the scrapers are divided adjacent to the chain and the scraper halves are affixed with two common screws extending transversely to the direction of conveyance to the two upwardly bent limbs of an open vertical chain link, which limbs extend between the scrapers. In this way the central web is avoided which is required in the usual scrapers, extending integrally throughout the width of the conveyor trough, in view of the central recess and which in this case is too weak. The scrapers consist inherently of symmetrical halves, which may be sufficiently dimensioned adjacent to their joint in order to resist all stresses occurring whereas it is not necessary to reduce the height of the central recess required owing to the teeth of the sprockets. For the connection to the chain, two screws of adequate strength are sufficient. This results in the further advantage that the scraper halves engage the chain with a relatively wide base so that any canting of the scrapers is precluded when the chain is taut.

To provide for a particularly high strength of the scrapers the scraper halves may be T-shaped in horizontal section above the chain guide, the flange disposed in the direction of conveyance having on both sides a transverse bore for receiving the fixing screws. The side edges of the upwardly bent limbs of the chain links serving for fixing the scrapers may be beveled in the shape of a wedge and the scraper halves may have corresponding recesses at their fixing faces so that a particularly snug fit and firm connection is achieved when the parts are screwed together.

The subject matter of the invention is shown by way of example in the accompanying drawings, in which—

Figure 2:
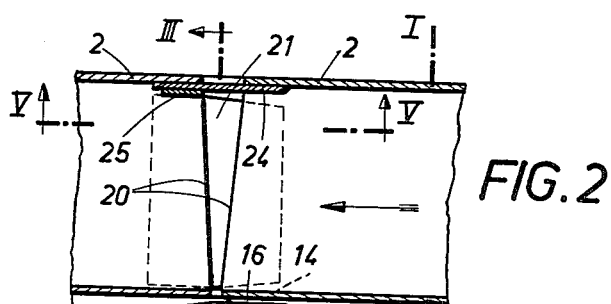
Figure 3:
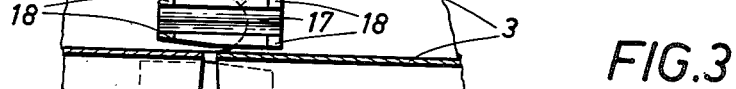
Figure 3:
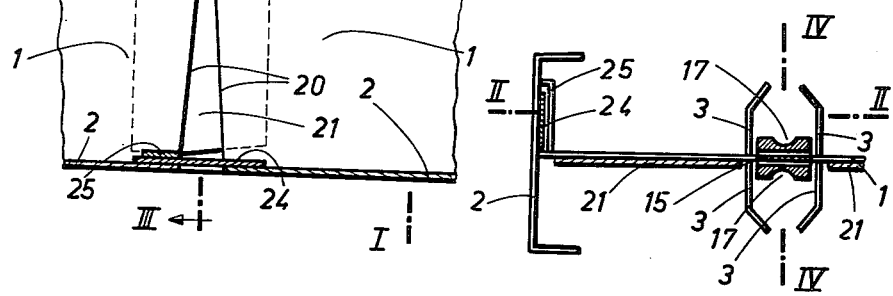

FIG. 1 shows a single-chain scraper conveyor in a transverse sectional view taken on line I—I of FIG. 2, FIG. 2 is a horizontal sectional view taken on line II—II of FIG. 3 on a reduced scale and shows the joint of two sections of the conveyor trough with the chain removed, FIG. 3 is a transverse sectional view taken on line III—III of FIG. 2, FIG. 4 is a longitudinal sectional view taken on line IV—IV of FIG. 3 on an enlarged scale, FIG. 5 is a longitudinal sectional view taken on line V—V of FIG. 2, FIG. 6 is a horizontal sectional view taken on line VI—VI of FIG. 1 on a smaller scale and showing a scraper, and FIG. 7 is a side elevation showing also on an enlarged scale as a detail a chain link.

The single-chain scraper conveyor consists of several sections, each of which consists of the bottom 1 and the two side walls 2. Two stay plates 3 are welded to the upper and lower surface 1 of the bottom of the conveyor trough. Each of the upper and lower surfaces of the bottom 1 of the conveyor trough has two stay plates 3 affixed thereto, the free longitudinal edges of which embrace the horizontal links 4 of a universally movable link chain so that the chain cannot slip out of this chain guide. The chain has scrapers connected thereto which have a central recess 5 which corresponds to the chain guide (FIG. 1). The scrapers consist of symmetric halves 6, 7, which are affixed by two common screws 10 extending transversely to the direction of conveyance to the two upwardly bent limbs 8 of open vertical chain links 9, which limbs extend between the scraper halves. Above the stay plates 3 the scraper halves 6, 7 are T-shaped in horizontal section, the flange extending in the direction of conveyance having on both sides a transverse bore 11 for receiving the fixing screws 10. The side edges 12 of the limbs 8 for the chain links 9 are bevelled in the shape of a wedge and the scraper halves 6, 7 have corresponding recesses 13 at their fixing surfaces.

To enable the arrangement of the sections of the conveyor trough at an angle relative to each other the bottom 1 of one trough section has a semicircular recess 14, which receives a conforming tongue 15 of the bottom of the other section. The end wall of the recess 14 is of semicircular section in a horizontal plane, that is, a plane longitudinal of the trough. The side walls of the recess flare outwardly in a vertical plane toward the tongue-bearing trough section. The universal pivot joint formed when the tongue 15 conformingly engages the end wall of the recess 14 is bridged between the stay plates by cover rails 16 which form a guide groove 17 for the vertical chain links 9 and have oblique run-up surfaces 18 at their ends and are welded to the bottom of one trough section (on the right in FIGS. 2 and 4). It is apparent from FIG. 4 that those parts of the cover rails 16 which protrude beyond the bottom of the right-hand section are bevelled on their confronting sides so that a wedge-shaped gap 19 is formed between them which enables a pivotal movement of the two sections in a vertical direction.

The transverse edges 20 of the bottoms 1 of the two sections extend obliquely rearwardly towards both sides from the center of the recess 14 and of the tongue 15. A lap plate 21 welded to the underside prevents the material conveyed from falling through. Similarly, the transverse edges 22 and 23 of the side walls 2 and of the stay plates 3, respectively, extend obliquely upwardly and downwardly from the bottom 1 of the conveyor trough bottom so that the arrangement of the two trough sections at a vertical angle relative to each other is not interfered with. Flexible flaps 24 are welded above the bottom 1 of the conveyor trough to the side walls 2 of the one trough section (on the right in FIGS. 2 and 5) at the rear end thereof, considered in the direction of conveyance, which is indicated by an arrow. These flaps engage the side walls of the adjacent trough section and are received there by a keeper 25. These flaps prevent the material conveyed from falling through the lateral butt joints whereas owing to their flexibility they do not prevent the arrangement of the sections at a lateral angle.

What is claimed is:

1. A single-chain scraper conveyor which comprises a conveyor trough consisting of several longitudinal sections each of which has a bottom and two side walls, a plurality of scrapers movably arranged in said trough to slide on said bottom and in guided engagement with said side walls, a central chain guide consisting of two stay plates welded to the upper surface of said bottom and two stay plates welded to the lower surface of said bottom of each of said sections, and a universally movable link chain disposed in said chain guide and operable to move said scrapers, said chain comprising horizontal and vertical links, said stay plates having free longitudinal edges inwardly embracing said horizontal chain links, said scrapers having a recess conforming to and receiving said chain guide, one of two adjacent sections of said trough being formed at the end next to the other of said two sections with a recess having an end wall of approximately semicircular section in a longitudinal plane, and longitudinal walls flaring outward of said recess transversely of said plane in a direction toward said other trough section, and the other of said two sections being provided with a tongue conforming to and engaging the end wall of said recess said tongue being pivotable in said plane and between said side walls transversely of said plane, said recess and tongue being disposed between said stay plates, two cover rails being provided which extend across said sections above and below the same adjacent to said recess and which are formed with a guide groove for the vertical chain links, said cover rails being welded to the bottom of one of said two sections and having protruding parts defining between them a wedge-shaped gap.

2. A single-chain scraper conveyor which comprises a conveyor trough consisting of several longitudinal sections each of which has a bottom and two side walls, a plurality of scrapers movably arranged in said trough to slide on said bottom and in guided engagement with said side walls, a central chain guide consisting of two stay plates welded to the upper surface of said bottom and two stay plates welded to the lower surface of said bottom of each of said sections, and a universally movable link chain disposed in said chain guide and operable to move said scrapers, said chain comprising horizontal and vertical links, said stay plates having free longitudinal edges inwardly embracing said horizontal chain links, said scrapers having a recess conforming to and receiving said chain guide, each of said scrapers consisting of two halves extending an opposite sides of said chain and said vertical chain links being open and having vertical limbs extending upwardly between the two halves of each of said scrapers, said halves of each of said scrapers being affixed to said limbs of one of said vertical chain links with two common screws extending transversely to said chain, said scraper halves being T-shaped in horizontal section above said chain guide and having a flange extending in the direction of the chain, which flange has on both sides a transverse bore for receiving said screws, said limbs having side edges bevelled in the shape of a wedge and said scraper halves having surfaces engaging said limbs and formed with recesses conforming to said side edges, and means connecting two longitudinally consecutive sections of said trough for relative movement in two longitudinal planes substantially perpendicular to each other.

3. A single-chain scraper conveyor comprising a conveyor trough including a plurality of longitudinally consecutive sections, each trough section having a bottom wall, two side walls, and a chain guide section centrally mounted on said bottom wall, said chain guide sections jointly constituting a longitudinal chain guide formed with a continuous longitudinal slot having horizontally spaced edges, two adjacent ones of said trough sections forming a pair; a universally movable link chain longitudinally slidable in said slot, said chain having a horizontal width greater than the spacing of said edges; a plurality of scrapers longitudinally spaced in said trough and having transversely extending faces for scraping cooperation with said bottom wall and said side walls; a plurality of fastening means secured to said chain and to respective ones of said scrapers for joint longitudinal movement of said scrapers and of said chain; a tongue on the bottom wall of one member of a pair of said trough sections and extending therefrom toward the other member, the bottom wall of said other member being formed with a recess having an end wall of substantially semicircular section in a longitudinal plane, and longitudinal walls flaring outward of said recess transversely of said plane in a direction toward said one member, said tongue conforming to said end wall and being pivotable in said plane and transversely of said plane while engaging said end wall, said recess receiving said tongue to form a universal pivot connection between said members vertically aligned with said chain guide; and cover rail means extending from the chain guide section of one of said members and movably received in the chain guide section of the other member for guiding said chain over said pivot connection.

4. A single-chain scraper conveyor comprising a conveyor trough including a plurality of longitudinally consecutive sections, each trough section having a bottom wall, two side walls, and a chain guide section centrally mounted on said bottom wall, said chain guide sections jointly constituting a longitudinal chain guide formed with a continuous longitudinal slot having transversely horizontally spaced edges; a universally movable link chain longitudinally slidable in said slot and including a plurality of first links extending outward of said slot, and a plurality of second links intermediate said first links, said second links extending in a transverse horizontal direction over a distance greater than the spacing of said edges, whereby said chain is retained in said chain guide; a plurality of scrapers longitudinally spaced in said trough, each of said scrapers having two face portions extending transversely of said trough in a direction from said chain guide toward a respective one of said side walls; fastening means associated with each of said scrapers for simultaneously securing the two face portions thereof to each other and to one of said first links; and means connecting two longitudinally consecutive sections of said trough for relative movement in two longitudinal planes substantially perpendicular to each other.

References Cited in the file of this patent
UNITED STATES PATENTS

| | | |
|---|---|---|
| 2,297,632 | Mosley | Sept. 29, 1942 |
| 2,381,108 | Cartlidge | Aug. 7, 1945 |
| 2,756,867 | Russell et al. | July 31, 1956 |
| 2,903,122 | Geilenberg | Sept. 8, 1959 |

FOREIGN PATENTS

| | | |
|---|---|---|
| 647,306 | Great Britain | Dec. 13, 1950 |